(12) United States Patent
Tanaka et al.

(10) Patent No.: US 6,769,131 B1
(45) Date of Patent: Jul. 27, 2004

(54) IMAGE PROCESSING APPARATUS AND METHOD, IMAGE DISTRIBUTION SYSTEM AND STORAGE MEDIUM

(75) Inventors: Kenichiro Tanaka, Kawasaki (JP); Hiroshi Okazaki, Yokohama (JP)

(73) Assignee: Canon Kabushiki Kaisha (JP)

( * ) Notice: Subject to any disclaimer, the term of this patent is extended or adjusted under 35 U.S.C. 154(b) by 551 days.

(21) Appl. No.: 09/709,886

(22) Filed: Nov. 10, 2000

(30) Foreign Application Priority Data

Nov. 18, 1999 (JP) ............................................ 11-328425
Nov. 24, 1999 (JP) ............................................ 11-332667

(51) Int. Cl.[7] .............................................. H04N 7/18
(52) U.S. Cl. .................................................... 725/105
(58) Field of Search ......................... 725/105, 91, 114; 348/36, 39, 143, 211.4, 211.7, 211.8, 333.05; H04N 7/18

(56) References Cited

U.S. PATENT DOCUMENTS 5,016,173 A * 5/1991 Kenet et al. ................. 382/128
5,895,455 A * 4/1999 Bellinger et al. ............. 705/35
6,043,837 A * 3/2000 Driscoll et al. .............. 725/114
6,084,598 A * 7/2000 Chekerylla .................. 345/441

FOREIGN PATENT DOCUMENTS

EP      0 713 331 A1 * 5/1996  ............ H04N/7/18
JP      07 95547        4/1995

* cited by examiner

Primary Examiner—Nhon Diep
(74) Attorney, Agent, or Firm—Morgan & Finnegan, LLP

(57) ABSTRACT

A conventional movable range restricting function designates a movable range by using a numerical value of an angle of view. It is, therefore, difficult for a user to intuitively know this value. A trial and error basis is therefore necessary to obtain an optimum setting. Similarly, a user is required to set a value of the movable range of zoom without knowing beforehand the size of a zoomed object. In order to solve these problems, an image processing apparatus comprises a display control unit for displaying a panorama image on a display unit, the panorama image being formed by coupling a plurality of images taken with a controllable image pickup unit, and a setting unit for setting a visible range in the panorama image, an image in the visible range capable of being taken with the image pickup unit by controlling the unit, wherein the display control unit displays an image in the visible range set by the setting unit and an image outside of the visible range in different states capable of being visually discriminated.

43 Claims, 11 Drawing Sheets

FIG. 10A
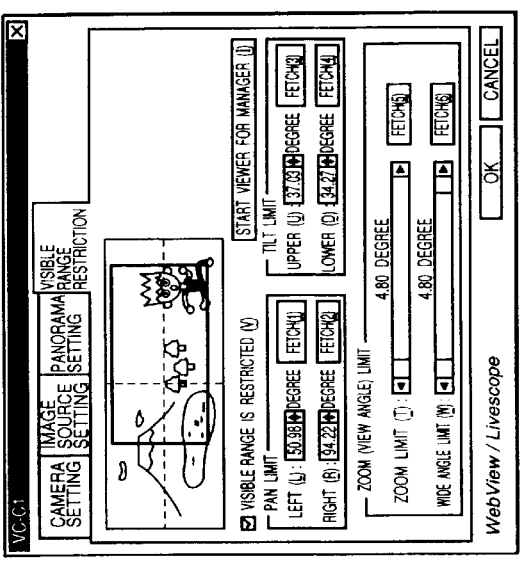
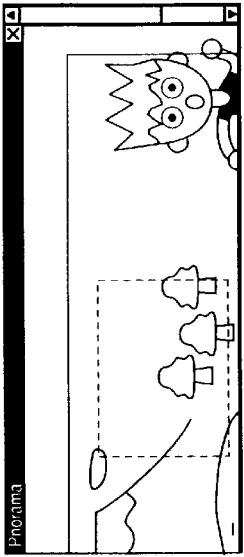
FIG. 10B
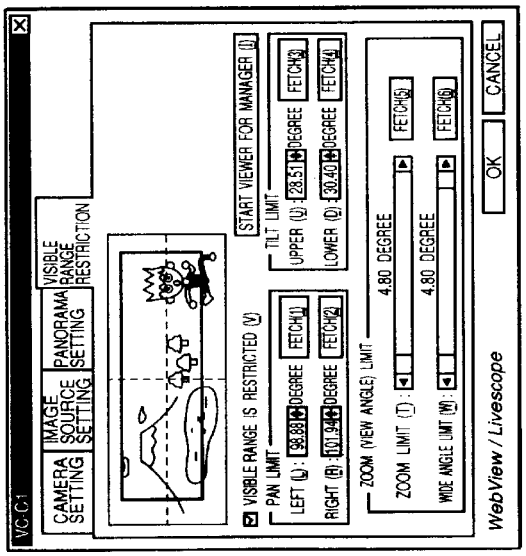
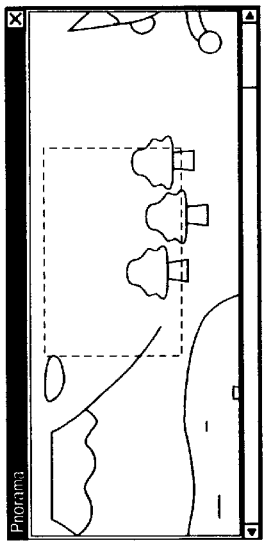
FIG. 10C
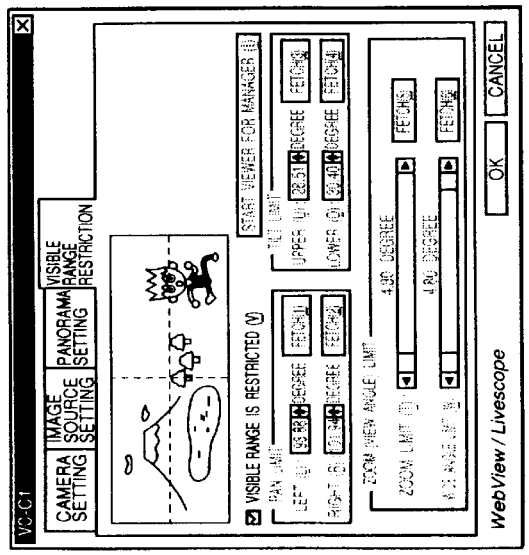
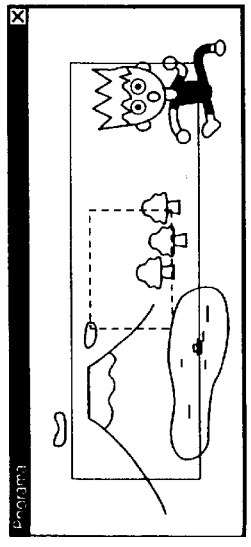

FIG. 11
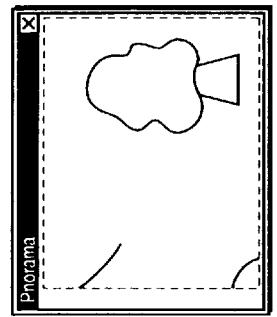
(c) (FINE IMAGE)
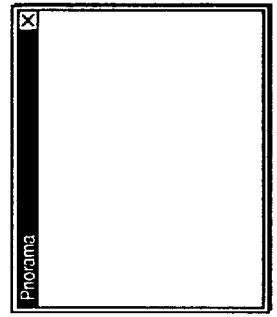
(b) (IMAGE OF BACK GROUND COLOR)
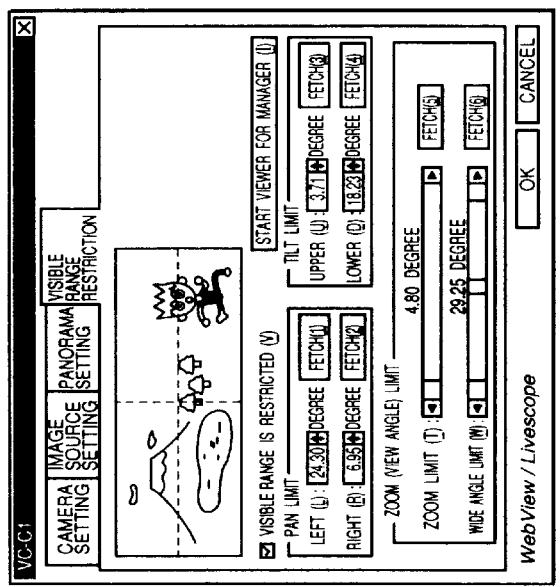
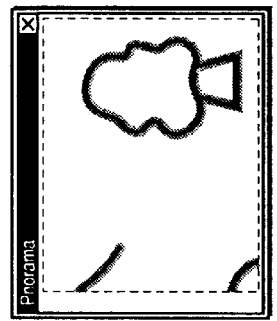
(a) (ROUGH IMAGE)

IMAGE PROCESSING APPARATUS AND METHOD, IMAGE DISTRIBUTION SYSTEM AND STORAGE MEDIUM

BACKGROUND OF THE INVENTION

1. Field of the Invention

The present invention relates to a server for distributing images taken with an image pickup apparatus over a network. The invention also relates to an image distribution system having such a server and clients for viewing images distributed over the network, and more particularly to a system capable of controlling pan/tilt/zoom of a camera in response to a request from a client.

2. Description of the Related Art

There are many types of commercially available cameras (such as VC-C1 and VC-C3 of CANON K.K.) capable of controlling pan/tilt/zoom by connecting them to computers. Such cameras are simply called cameras hereinafter. A program WebView (CANON K.K.) is known which can distribute images to users on a network with such cameras. A server connected to a camera on the network is called a camera server.

By controlling pan/tilt/zoom, a camera connected to the server can take an image even in an undesired area. If a person taken with the camera is zoomed in too much, the person is likely to feel resistant against being taken.

A remote monitoring system is also known in which pan/tilt/zoom of a camera connected to a network is remotely controlled and images taken with the camera are transmitted via the network to browse them. This system is disclosed in Japanese Patent Application Laid-Open No. 10-042279 "Camera Controlling Apparatus and Method" by Sato and Yamakawa. According to Japanese Patent Application Laid-Open No. 10-042279, a visible range restricting function is provided by which the movable range of pan/tilt/zoom can be set by an angle of view by using a slider bar. For example, an image at 30 degrees or larger in the right direction is not allowed to take, or an image at 12 degrees, or smaller in the down direction is not allowed to take. If a client user can freely control pan/tilt/zoom and the like, an image which a camera setter does not desire to be looked at can be viewed by the client user. The visible range restricting function can avoid this.

However, a conventional movable range restricting function designates the movable range by using a numerical value of an angle of view. It is, therefore, difficult for a user to intuitively know this value. A trial and error basis is therefore necessary to obtain an optimum setting. Similarly, a user is required to set a value of the movable range of zoom without knowing beforehand the size of a zoomed object.

Another approach to controlling a camera is also known. With this approach, when controlling the camera, a client user designates a desired area in a panorama image of the whole photographing area of the camera taken beforehand. However, if a panorama image of a limited area is used, each time this limited area is changed, a camera setter is required to take again a new panorama image.

Since the panorama image of the whole photographing area is used not only by a client user but also by the administrator when the user visible range is limited, it is necessary to register the panorama image of the whole photographing area at the server.

The panorama image used is a still image and is not renewed by an image currently taken with the camera. It is not so much desirous, however, that a client user can look at even a still image outside of the visual range. It is preferable to provide some countermeasure so as not to be looked at the undesired image. For example, in the panorama image displayed in order to show the whole photographing area, an image outside of the visible range may be drawn in color or in mosaic. However, in this case, a client user controls the camera, being definitely conscious of the visible range restriction. The client user can know the details of the visible range restriction setting in the whole photographing area. The camera setter sensitive to security does not desire that such details are made public.

SUMMARY OF THE INVENTION

It is an object of the invention to solve all or at least one of the above-described problems.

It is another object of the invention to make a visible range restriction be intuitively set quickly while viewing an image.

It is still another object of the invention to make a zoom range be intuitively set quickly while viewing an image.

In order to achieve the above objects, an embodiment of the invention provides, an image processing apparatus comprising: a display control unit for displaying a panorama image on a display unit, the panorama image being formed by coupling a plurality of images taken with a controllable image pickup unit; and a setting unit for setting a visible range in the panorama image, permittable to be taken with the image pickup unit by controlling the unit, wherein the display control unit displays an image in the visible range set by the setting unit and an image out side of the visible range in different states capable of being visually discriminated.

An embodiment of the invention also provides an image processing apparatus comprising: a display control unit for displaying an image in a photographing area of a controllable image pickup unit on a display unit; a rectangle display unit for displaying a rectangle in the image displayed on the display unit, the rectangle indicating a zoom ability of the image pickup unit; a zoom ability setting unit for setting a range of the zoom ability of the image pickup unit; and a display change unit for changing a size of the rectangle in accordance with the setting made by the zoom ability setting unit.

It is another object of the present invention to provide an image processing apparatus and method and an image distribution system capable of making a client user not consicious of a movable range restriction.

In order to achieve the above object, an embodiment of the invention provides an image processing apparatus comprising: a receiving unit for receiving image information in a visible range in a whole photographing area of an image pickup unit; a display control unit for displaying an image in the visible range on a display unit in accordance with the image information received by the receiving unit, without displaying an area outside of the visible range; and a receiving unit for receiving an instruction to the visible range displayed on the display unit when the photographing area of the image pickup unit is changed.

An embodiment of the invention also provides an image processing apparatus comprising: a unit for generating a panorama image indicating a whole photographing area of a remotely controllable image pickup unit; a setting unit for setting a visual range by designating an area in the panorama image; a transmitting unit for transmitting an image in the visual range set by the setting unit; and a receiving unit for receiving a control of the image pickup unit, the control being performed by using the image in the visual range.

Other objects and features of the present invention will become apparent from the following detailed description of embodiments when read in conjunction with the accompanying drawings.

BRIEF DESCRIPTION OF THE DRAWINGS

FIGS. 10A, 10B and 10C illustrate another method of displaying a panorama image.

FIG. 11 shows an example of an image in a narrow visible range.

DETAILED DESCRIPTION OF THE PREFERRED EMBODIMENTS

[First Embodiment]

Figure 1:
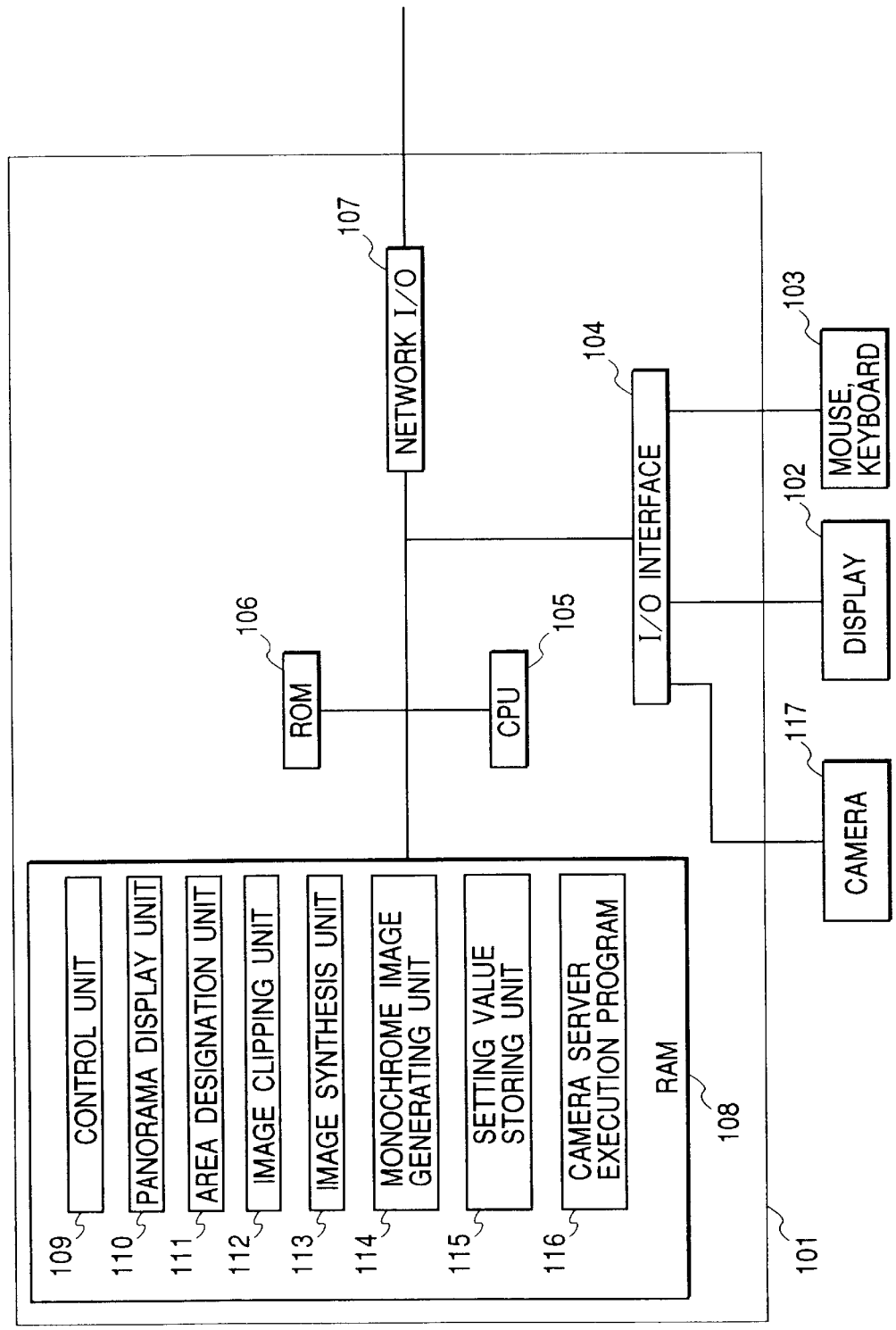
FIG. 1 is a block diagram showing the structure of a camera server according to an embodiment of the invention.

FIG. 1 is a block diagram showing characteristic points of the invention. Elements in this block diagram will be described.

Reference numeral 101 represents a camera server using a personal computer.

Reference numeral 102 represents a display.

Reference numeral 103 represents a mouse l and a keyboard.

Reference numeral 104 represents an input/output interface for connection between the server 101 and peripheral apparatus.

Reference numeral 105 represents a CPU for controlling various elements of the server 101.

Reference numeral 106 represents a ROM storing a camera control program, a display control program and the like.

Reference numeral 107 represents a network I/O for inputting an image transmission request from a network and outputting an image taken with a camera 117 to the network and for performing other operations.

Reference numeral 108 represents a RAM for storing various executable programs which are read and executed under the control of CPU 105.

Reference numeral 109 represents a control unit or executable program for controlling and operating various units essential to the invention.

Reference numeral 110 represents a panorama image display unit. A panorama image is formed beforehand and stored in an external storage unit. When a camera server execution program 116 is initiated, the panorama image is supplied to the panorama image display unit 110.

Reference numeral 111 represents an area designation unit for setting a rectangular area whose size and position can be changed by dragging the corner of the area (rubber band) with a mouse.

Reference numeral 112 represents a clipping unit for clipping a rectangle designated by the area designation unit 111 from a panorama image.

Reference numeral 113 represents an image synthesis unit for synthesizing a plurality of images to form a single image. The image synthesis unit 113 also has a function of controlling the camera to take a plurality of images in response to a user instruction and synthesizing a panorama image in the whole photographing area of the camera.

Reference numeral 114 represents a monochrome image generating unit for generating a monochrome image from a color image.

Reference numeral 115 represents a setting value storing unit for storing a movable range value of pan/tilt/zoom.

Reference numeral 116 represents a camera server execution program. This program realizes a function similar to that of "Camera Controlling Apparatus and Method" described in Japanese Patent Application Laid-Open No. 10-042279. The contents of this program are detailed in Japanese Patent Application Laid-Open No. 10-042279 so that the description thereof is omitted.

The camera server 101 can limit the movable range of pan/tilt/zoom. This limit information is read from the setting value storing unit 115 and is used when a camera server execution program is executed.

Reference numeral 117 represents the camera whose pan/tilt/zoom can be controlled by the camera server 101.

The units 109 to 115 and program 116 include executable programs and data which are stored in RAM 108 and executed by CPU 105.

Figure 2:
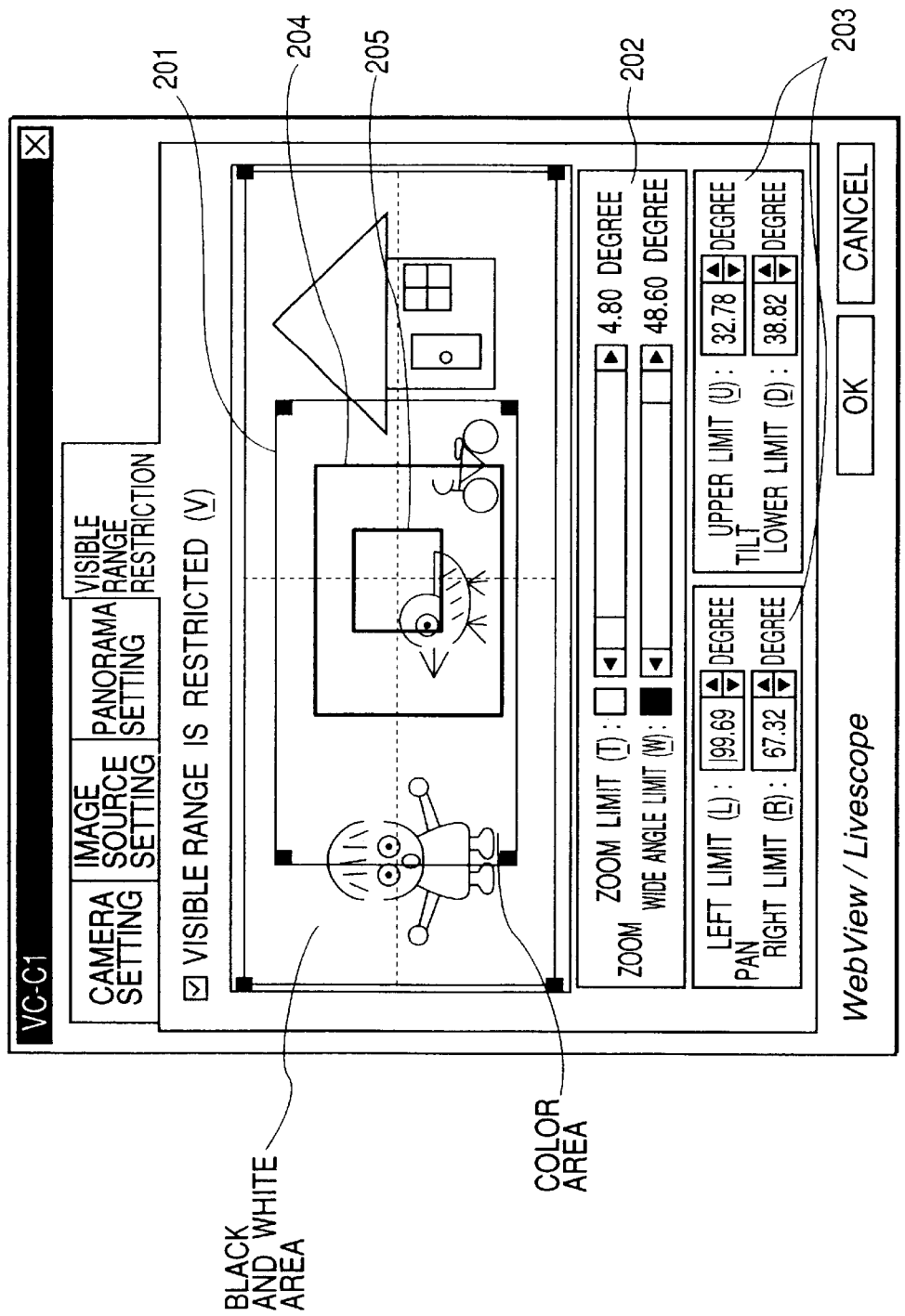
FIG. 2 is a diagram illustrating a user interface.

FIG. 2 shows an example of a user interface to be used particularly when the camera server controls pan/tilt/zoom and the like of the camera.

Reference numeral 201 represents a rubber band used for setting a visible range. A user on the network can set a visible range in which the camera can take an image, by changing the size of the rubber band by operating a mouse or the like on the display screen.

Reference numeral 202 represents zoom setting slider bars. The upper slider bar is used for setting a zoom limit, and the lower slider bar is used for setting a wide angle limit. By operating these bars, a user on the network can set the zoom range in which the camera can take an image.

Reference numeral 203 represents a pan/tilt value setting field used for setting the visible range by directly entering values of the visible range. The size and position of the rubber band 201 change with entered numerical values, whereas the numerical values change with the size and position of the rubber band 201 changed by the mouse or the like.

Reference numeral 204 represents a wide angle limit indicator indicating a wide angle limit of the camera.

Reference numeral 205 represents a zoom limit indicator indicating a zoom limit of the camera.

With reference to FIG. 2, the operation of the user interface will be described.

The size and position of the visible range setting rubber band 201 can be changed by using the mouse or the like. The inner area of this rectangle area is the visible range in which a color image is displayed. The outer area of the rectangle area is an invisible range in which a black and white image is displayed. The maximum size of the rubber band is equal to the panorama image area, and the minimum size is equal to the size of the zoom limit indicator indicating the zoom limit of the camera.

If the rubber band 201 is made too small, the movable range may become smaller than the zoom limit setting value. For example, if the wide angle limit is 50 degrees and the rubber band is made small at the right limit of 10 degrees and left limit of 10 degrees, i.e., a lateral pan width of 20 degrees, then the visible range becomes smaller than the wide angle limit. In such a case, the setting by the rubber band has a priority over the setting by the zoom range. In this case, the wide angle limit is automatically set to 20 degrees and the size of the wide angle indicator 204 and the value of the zoom setting slider bar are changed.

As the zoom setting slider bars 202 are moved, the indicators 204 and 205 are changed correspondingly. Centers of rectangles of the indicators are always coincident with the center of the panorama image, and only the sizes thereof change. The zoom limit value is never larger than the wide angle value. As the sizes of the indicators 204 and 205 are changed with the mouse or the like, the zoom setting slider bars 202 move correspondingly.

If the visible range setting rubber band is moved toward the side of the panorama image and the size thereof is reduced, the indicators and rubber band may cross or separate from each other. This proposes no problem because the indicators are used only for indicating the zoom setting values.

Figure 3:
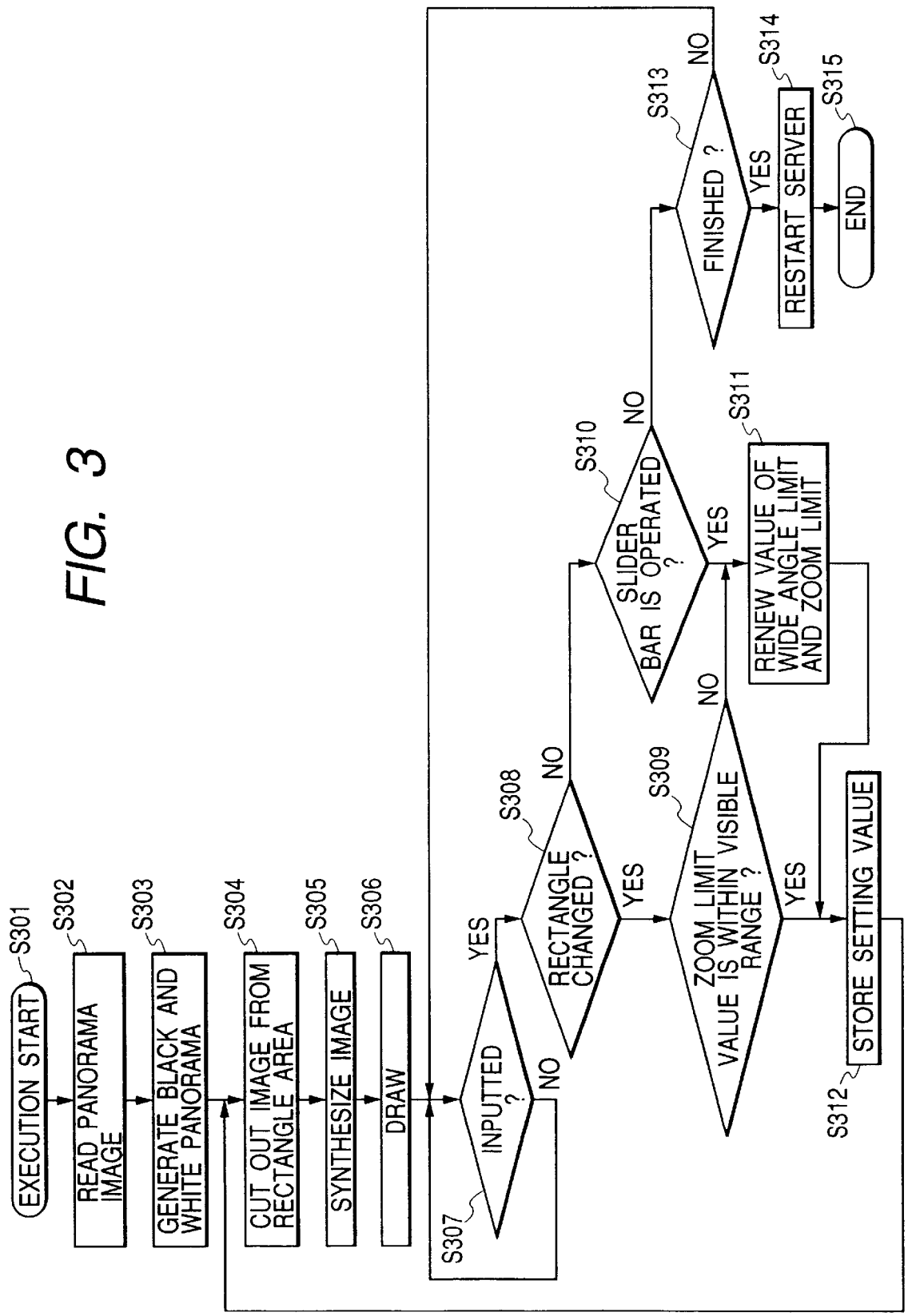
FIG. 3 is a flow chart illustrating a visible range restriction setting operation according to an embodiment of the invention.

Next, with reference to FIG. 3, the operation of setting the visible range will be described.

The program starts at Step S301.

At Step S302, the control unit 109 initiates the camera server execution program 116 to read a panorama image indicating the whole photographing area of the camera and information on the panorama image (such as limit values of pan/tilt/zoom when there is no visible range limit).

At Step S303, the control unit 109 initiates the monochrome image generating unit 114 to generate a monochrome image of the panorama image.

At Step S304, the control unit 109 reads a currently set movable range of pan/tilt from the setting value storing unit 115 and initializes the area designation unit 111. The control unit 109 initiates the image clipping unit 112 to clip an image in the visible range from the color panorama image.

At Step S305, the control unit 109 initiates the image synthesis unit 113 to synthesize the monochrome image generated at Step S303 and the color image acquired at Step S304. A synthesized image is therefore formed having the monochrome image outside of the visible range and the color image inside of the visible range.

At Step S306, the control unit 109 initiates the panorama image display unit 110 to draw the image synthesized at Step S305. The zoom movable range is acquired from the setting value storing unit 115 to draw the zoom indicators 204 and 205 on the panorama image.

At Step S307, the operation waits for a user input. If there is a user input, the flow advances to Step S308.

At Step S308 it is judged whether the user input is to operate the rubber band 201. If the rubber band, the flow advances to Step S309, whereas if not, the flow advances to Step S310.

At Step S309 it is judged whether the rubber band 201 changes its size smaller than the wide angle and zoom limit values. If the zoom limit values (wide angle and zoom limit values) are larger than the visible range, it is necessary to change the zoom limit values so that the flow advances to Step S311, whereas if not, the flow advances to Step S312.

At Step S312, the limit values of pan/tilt/zoom are stored in the setting value storing unit 115 to thereafter return to Step S304.

At Step S310 it is judged whether the user input is the operation of the slider bars 202. If so, the flow advances to Step S311, whereas if not, the flow advances to Step S313.

At Step S311, the limit values of wide angle and zoom are renewed. First, the values set by the user are acquired from the slider bars 202. If the set values are out of the visible range, these values are changed so that they are set in the visible range. The values are also changed so that the zoom limit is not larger than the wide angle limit. The slider bars 202 are then moved to take new values to thereafter advance to Step S312.

At Step S313 it is judged whether the visible range restriction setting has been completed. If completed, the flow advances to Step S314, whereas if not, the flow returns to Step S307.

At Step S314, the camera server execution program 116 is initiated again. The camera server execution program 116 checks the data in the setting value storing unit 115 to limit the visible range.

At Step S315 the visible range setting operation is terminated.

In this embodiment, an image in the visible range is displayed in color and an image outside of the visible range is displayed in black and white. Instead of the black and white, the image outside of the visible range may be displayed not at all or it may be displayed as a frame line. However, it is easier to set the visible range by looking at the area outside of the visible range, and if the image outside of the visible range is displayed not at all, it is hot easy to change the visible range, particularly to broaden the visible range. Further, if the frame line only is displayed, the inside and outside of the frame line are difficult to be discriminated at a glance.

In contrast, in this embodiment, although an image outside of the visible range is displayed, the color image in the visible range can be recognized more easily. Accordingly, the inside and outside of the visible range can be easily discriminated. Further, an image made public to users on the network can be recognized easily.

The invention is not limited only to this embodiment.

For example, an image in the visible range may be displayed in black and white and an image outside of the visible range is displayed in color. An image in the visible range may be displayed in black and white and an image outside of the visible range is displayed in inverted black and white. This is particularly effective for a monochrome display monitor. It is obvious that different color hues or different brightness may be used for the inside and outside of the visible range. In summary, it is sufficient if the images in the inside and outside of the visible range are displayed in a manner capable of being visually discriminated.

The images in the whole photographing area of the camera are synthesized to form the panorama image, and the visible range is set in this panorama image. The visible range can therefore be easily recognized. Although the panorama image is stored beforehand in the memory, the panorama image may be synthesized by initiating the image synthesis unit when the visible range is set. By using this newly generated panorama image, the visible range may be set.

Since the numerical values representative of the movable range are displayed at the same time when the visible range is displayed, the operation and degree of freedom of the visible range setting can be improved. User preference may be made effective when setting the visible range. For example, the visible range may be set first roughly by changing the rectangle area on the display screen, and then it is set finely by changing the numerical values, e.g., by changing 0.01°, when it is difficult to set the range by looking at the rectangle area.

Since the zoom ability is restricted by limiting the zoom movable range, it is possible not to, display a detailed image for the protection of privacy and business secret. If the setting is possible only by using numerical values, it is difficult to recognize to what degree an image can be magnified or the area of the image can be broadened. In this embodiment, however, the zoom ability can be easily set because it is possible to check the size of an image displayed on the display screen. Furthermore, since the indicators 204 and 205 and zoom setting slider bars 202 are displayed synchronously with a setting change, it is easy to recognize from the image the setting change by either of the indicators or bars.

The invention may be applied to a system constituted of a plurality of apparatus (e.g., host computer, interface, reader, Web server, camera server, and printer) or to each apparatus (e.g., Web server or camera server).

As described so far, according to the embodiment, images in the inside and outside of the visible range are displayed in a manner capable of being visually discriminated. It is therefore possible to intuitively and quickly set a visible range restriction.

Since the visible range is displayed on the panorama image, the visible range can be set easily.

An image in the visible range is displayed in color and an image outside of the visible range is displayed in black and white. Accordingly, an image in the visible range can be easily recognized visually and also an image outside of the visual range can be seen. It is therefore effective for changing the visual range.

Since the numerical values representative of the movable range are displayed at the same time when the visible range is displayed, the operation and degree of freedom of the visible range setting can be improved.

The zoom movable range to be set by limiting the zoom ability can be set intuitively and quickly by checking the size of an image displayed on the display screen.

The zoom ability can be changed easily by changing the size of the rectangular area because the size of an image can be checked.

[Second Embodiment]

Figure 4:
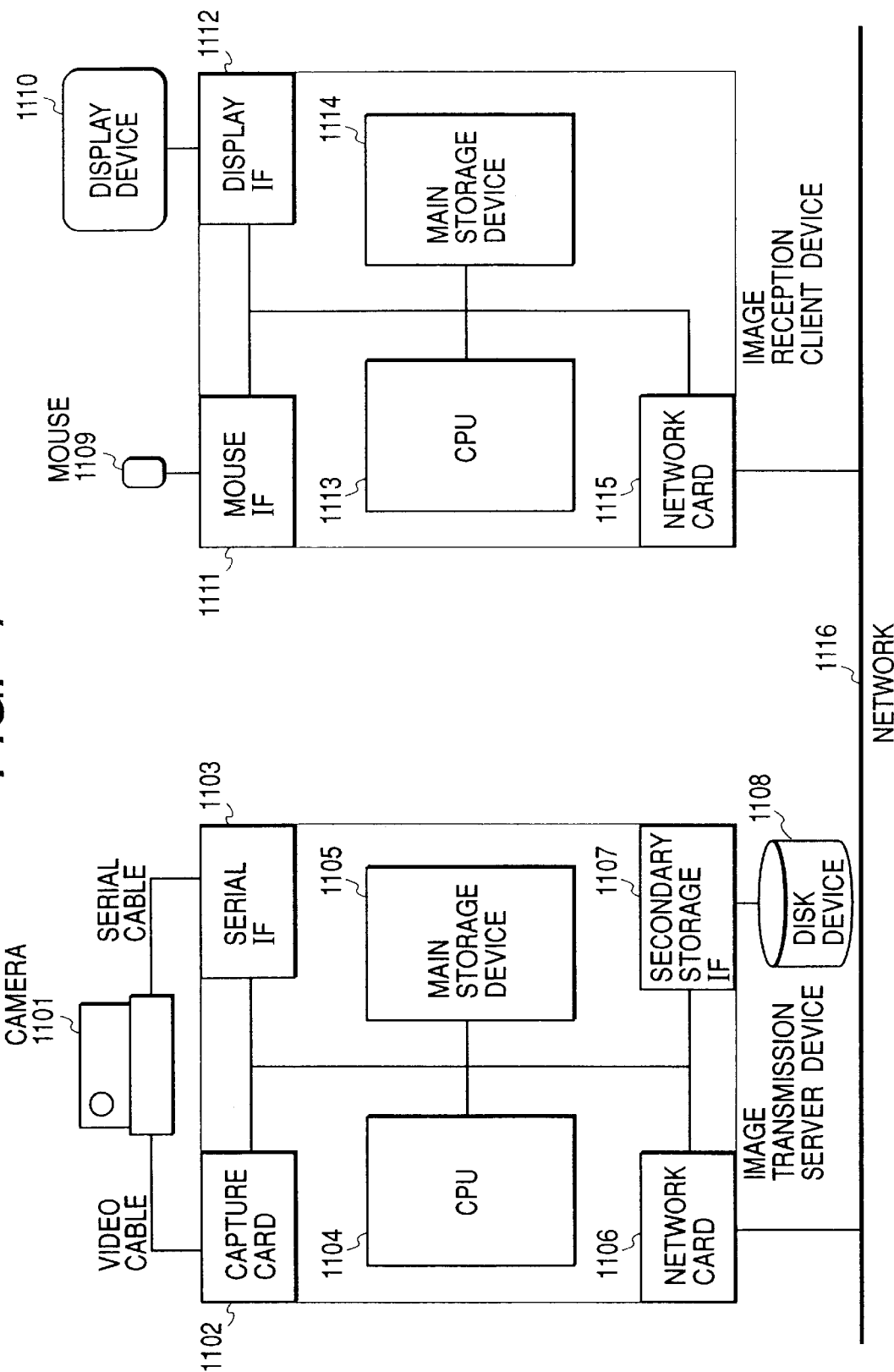
FIG. 4 is a block diagram showing the structure of an image distribution system according to an embodiment of the invention.

FIG. 4 is a block diagram showing the structure of an image transfer system in which an image transmission server is connected via a network to image reception clients.

Figure 5:
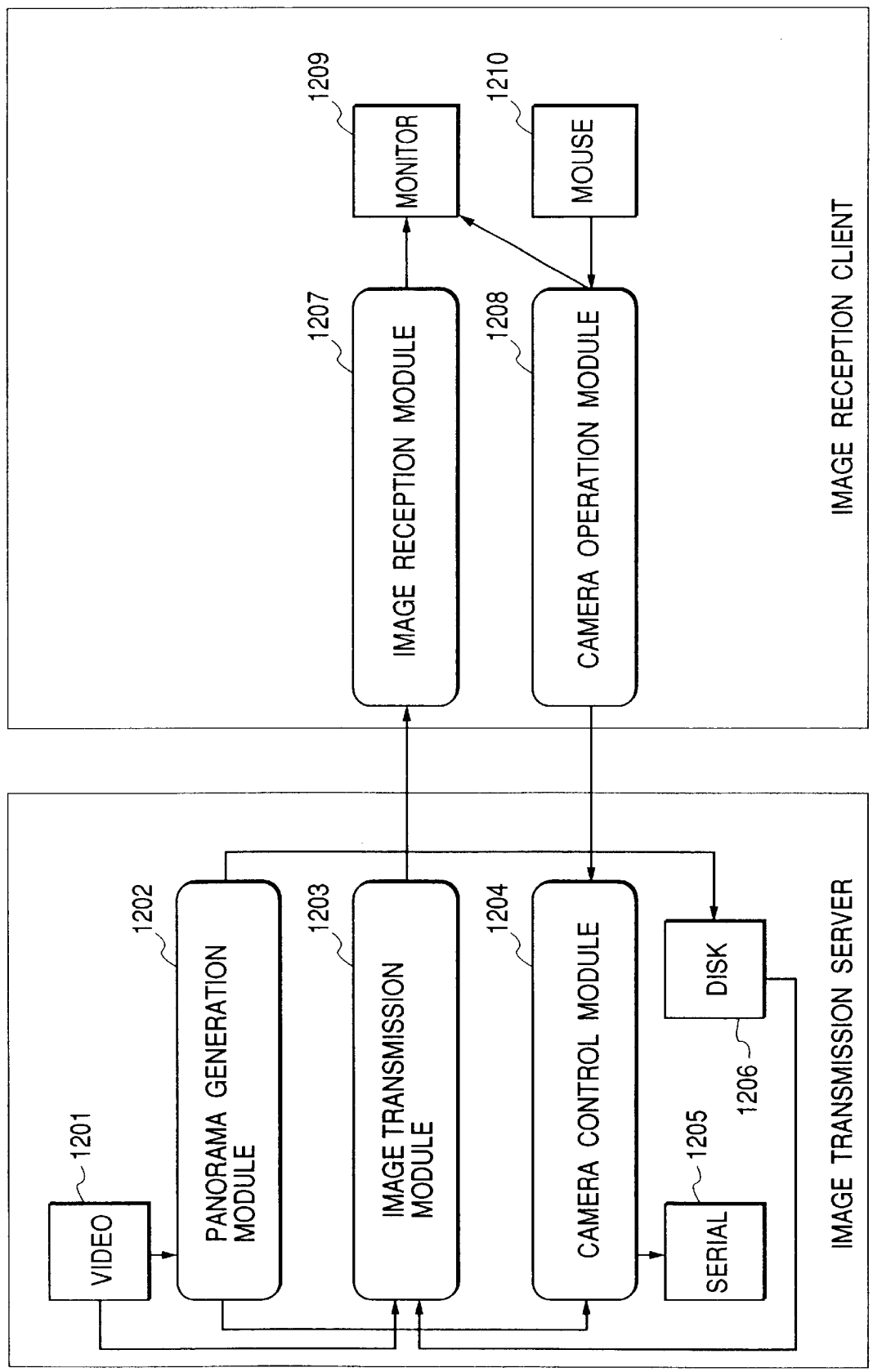
FIG. 5 is a block diagram showing the structure of software modules of the image distribution system of the embodiment.

FIG. 5 is a diagram showing the structure of software modules to be executed by CPUs of the server and clients.

An image transmission server is connected via an image cable and a serial cable to a camera 1101 whose pan/tilt/zoom and the like can be controlled. An image taken with the camera is supplied via the image cable to a capture card 1102 which digitalizes the image signal and supplies it to a main storage device 1105.

CPU 1104 executes functional modules made of various software stored in the main storage device 1105.

An image transmission module 1203 compresses the digital image and transmits it to the client via a network card 1106.

A panorama image generation module 1202 generates a panorama image from a plurality of digital images, compresses it and stores it in a disk 1108.

The image transmission module 1203 transmits the panorama image stored in the disk 1108 to the client, in response to a request from the client.

A camera control module 1204 transfers a control command for pan/tilt/zoom or the like of the camera connected via the serial cable to thereby control it.

The camera control module 1204 controls the camera in response to a camera control request from the client or from the panorama image generation module.

The image reception client receives image data from a network card 1115 and displays it on a display device 1110. Through GUI operation on the display device 1110, a camera control request is transmitted to the server via the network card 1115.

A CUP 1113 executes functional modules made of various software stored in a main storage device 1114.

An image reception module 1207 expands a compressed image received via the network card 1115 and displays it as a moving image on the display device 1110.

A camera operation module 1208 requests a panorama image from the server. The panorama image received via the network card 1115 is displayed in a window. A camera operation entered by a mouse on the display screen is supplied to the server via the network.

First, the panorama image generation module 1202 operating at the image transmission server will be described.

A panorama image is generated by setting the widest angle zoom value to the camera and sequentially taking with the camera an image in each area divided from the whole photographing area of the camera. The zoom value is set to the view angle a at the widest angle of the camera. The pan is decremented and incremented by $\alpha$ starting from 0 to dispersibly change it in a range not exceeding the maximum pan limit of the camera. An image is taken even at the camera maximum pan limit.

If the ratio of a vertical side to a horizontal side of an image is 3:4, the tilt is decremented and incremented by $\alpha \times 3/4$ starting from 0 to dispersibly change it in a range not exceeding the maximum tilt limit of the camera. An image is taken even at the camera maximum tilt limit.

It is assumed for example that the camera maximum view angle is 40 degrees, the pan movable range is from −90 degrees to +90 degrees and the tilt movable range is from −30 degrees to +25 degrees. In this case, an image is taken by changing the pan angle from −90, −80, −40, 0, 40, 80, to 90, the image having a pan view angle of 40 degrees corresponding to each of the ranges of −110 to −70, −100 to −60, −60 to −20, −20 to 20, 20 to 60, 60 to 100, and 70 to 110. In this case, the image is taken by changing the tilt angle from −30, 0 to 25 for each pan angle, the image having a tilt angle of 30 degrees corresponding to each of the ranges of −45 to −15, −15 to 15, and 10 to 40.

The images taken at the maximum pan and tilt limits may overlap adjacent images. In this case, after the overlapped areas are cut out, the images are pasted.

In order to form a fine panorama image, the whole photographing area of the camera may be divided so that adjacent images have an overlapped portion. In this case, the coordinate system of each divided area is transformed into a polar coordinate system and the overlapped portions are averaged.

The cut and paste process described above is not intended to limit the scope of the invention.

Next, a visible range restricting function realized by the camera control module of the image transmission server will be described.

An administrator of the image transmission server is supplied with this function so that the photographing area of the camera can be restricted and the camera cannot be directed to take the image not desired to be taken.

The range in which the camera is allowed to take an image is called the visible range. The visible range is designated by the right and left angle limit values from the pan center and the up and down angle limit values from the tilt center.

The angle limit values are not the fixed limit values of pan/tilt of the camera, but are the values for designating the visible range. The parameter limit values of pan/tilt therefore change with the current zoom values. For example, if the pan limit of the visible range is 50 degrees and the zoom value of the view angle is 20 degrees, the pan angle of the camera can be set to 40 degrees at a maximum (because 40+20/2= 50). If the zoom value of the view angle is 40 degrees, the pan angle of the camera can be set to 30 degrees at a maximum (because 30+40/2=50).

When the visible range is broadened by setting a wide angle to the camera, the camera automatically pans and tilts to direct inward. In the examples described above, under the conditions that the pan limits of the visible range is set to 50 degrees and the pan angle of the camera is 40 degrees, if the camera is zoomed out from the view angle of 20 degrees to the view angle of 40 degrees, the camera is automatically controlled to set the pan angle of 30 degrees so as not to take an image outside of the visible range.

Independently from pan/tilt, fixed limit values of the zoom parameters of the camera can be designated. Both the zoom limit value and wide angle limit value can be designated. The pan/tilt limit values of the visible range and the limit values of the zoom parameters have the following dependency:

Zoom limit≦Wide angle limit≦(pan left limit+pan right limit); and

Zoom limit≦Wide angle limit≦(pan up limit+pan down limit)×(4/3).

If the visible range of pan/tilt is set narrower, the wide angle limit is required to satisfy the above dependency, because if the wide angle is set an image outside of the visible range can be taken even if the camera is not panned or tilted.

With the visible range set as above, a panorama image having the pan/tilt limit values in the visible range is cut out to be used by the client to control the camera.

If the panorama image in the whole photographing area of the camera generated by the panorama image generation module is used even if the visible range is set, a client user can look at a scene outside of the visible range on the panorama image although it is not a live image. Furthermore, since the server administrator limits the visible range, the client user can know the limit in the visible range. The, administrator does not wish that the client user becomes conscious of the limit in the visible range set by the server administrator. The cut-out process may be performed either by the server or client.

Figure 6:
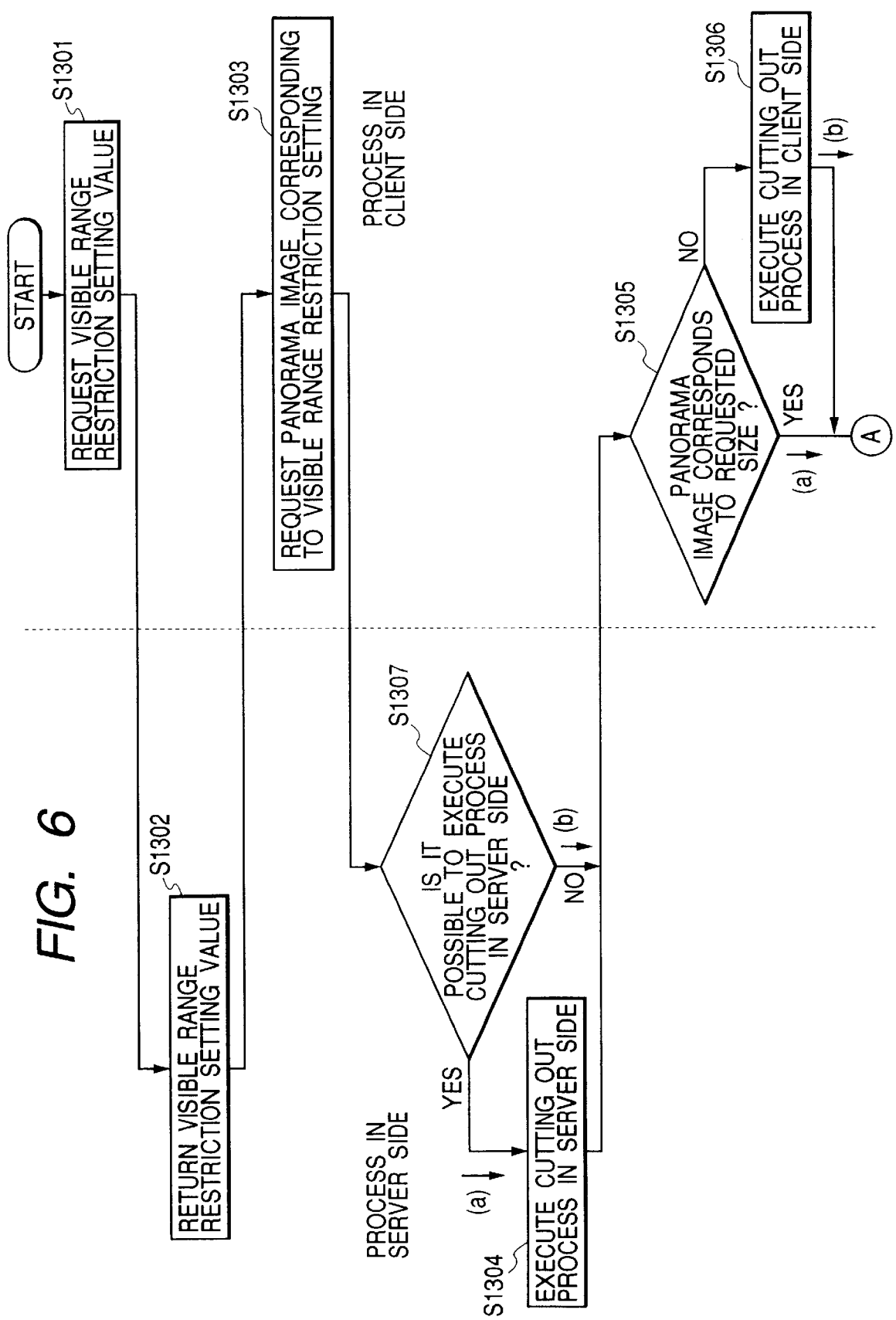
FIG. 6 is a flow chart illustrating an operation of capturing a panorama image in a visible range.

With reference to FIG. 6, the cut-out process will be described. It is assumed that the cut-out process can be performed either by the server or client.

First, a client requests a visible range, restriction setting value from the server (S1301). In response to this, the server returns the visible range restriction setting value back to the client(S1302).

Upon reception of the visible range restriction setting value from the server, the client requests a panorama image from the server by designating a request range of the panorama image. In this case, the received visible range restriction setting value is used as the request range of the panorama image (S1303).

If the cut-out process can be executed by the server (S1307), the panorama image cut out by the server is transmitted to the client (S1304), whereas if not at S1307, the server sends the panorama image and the angle values corresponding to the right and left and up and down ends of the panorama image, to the client. The client checks whether the received panorama image is coincident with the requested size (S1305). If not, the cut-out process is executed by the client (S1306).

If the cut-out process is executed by the server at S1304, the angle values corresponding to the right and left and up and down ends of the panorama image correspond to the requested size of the panorama image.

Figure 7A:
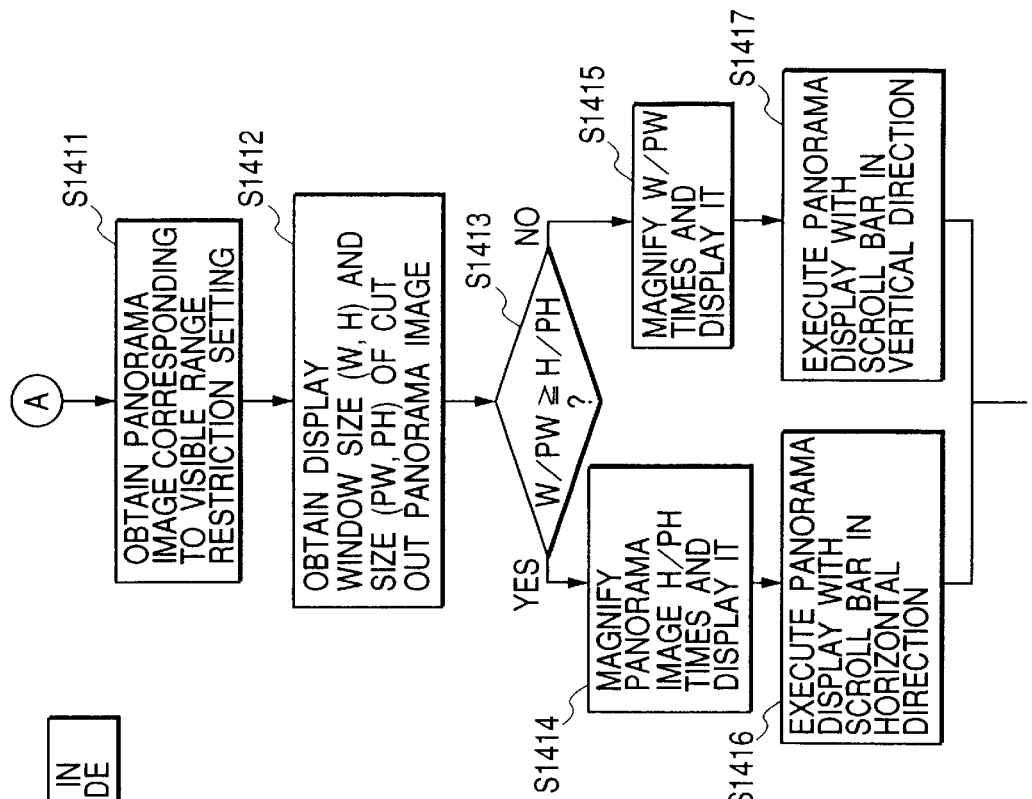
FIGS. 7A and 7B are flow charts illustrating an operation of displaying a panorama image.
Figure 7B:
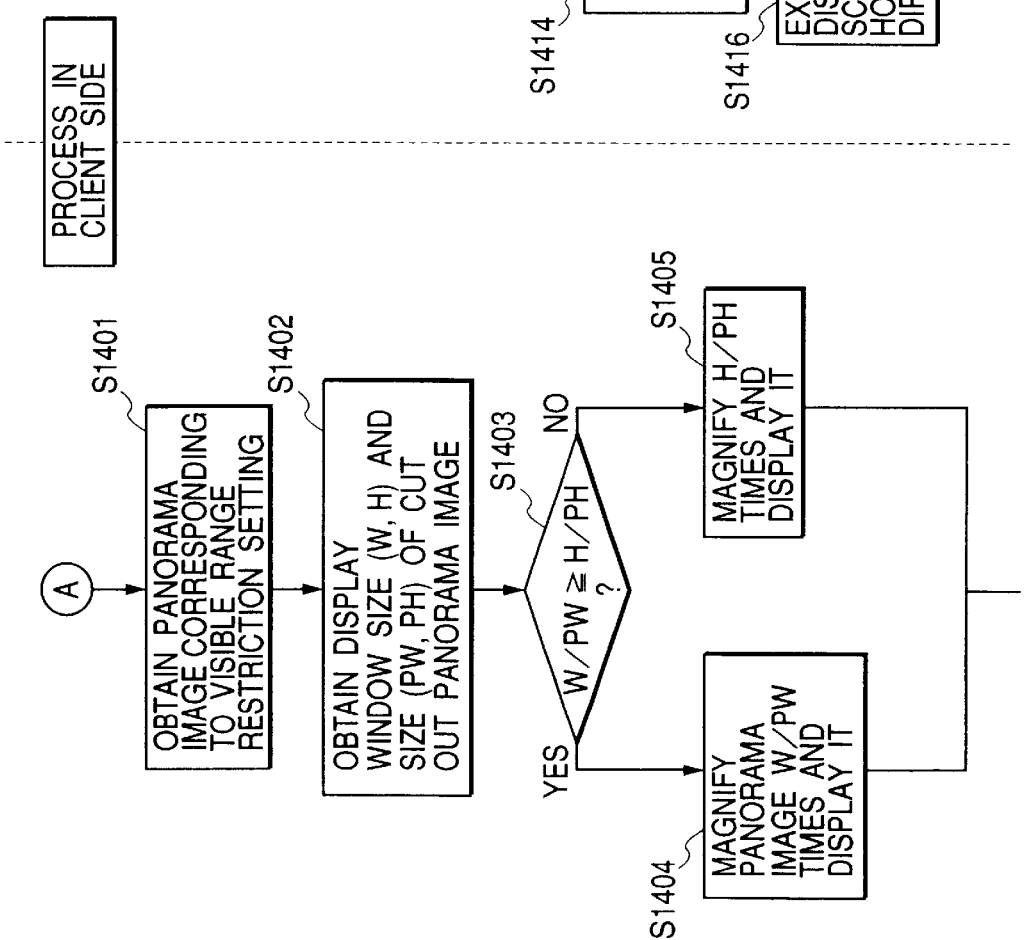

After the panorama image in the visible range is obtained by the processes shown in FIG. 6, a variable magnification process shown in FIGS. 7A and 7B is performed. The details of this process shown in FIGS. 7A and 7B will be later given.

Figure 8:
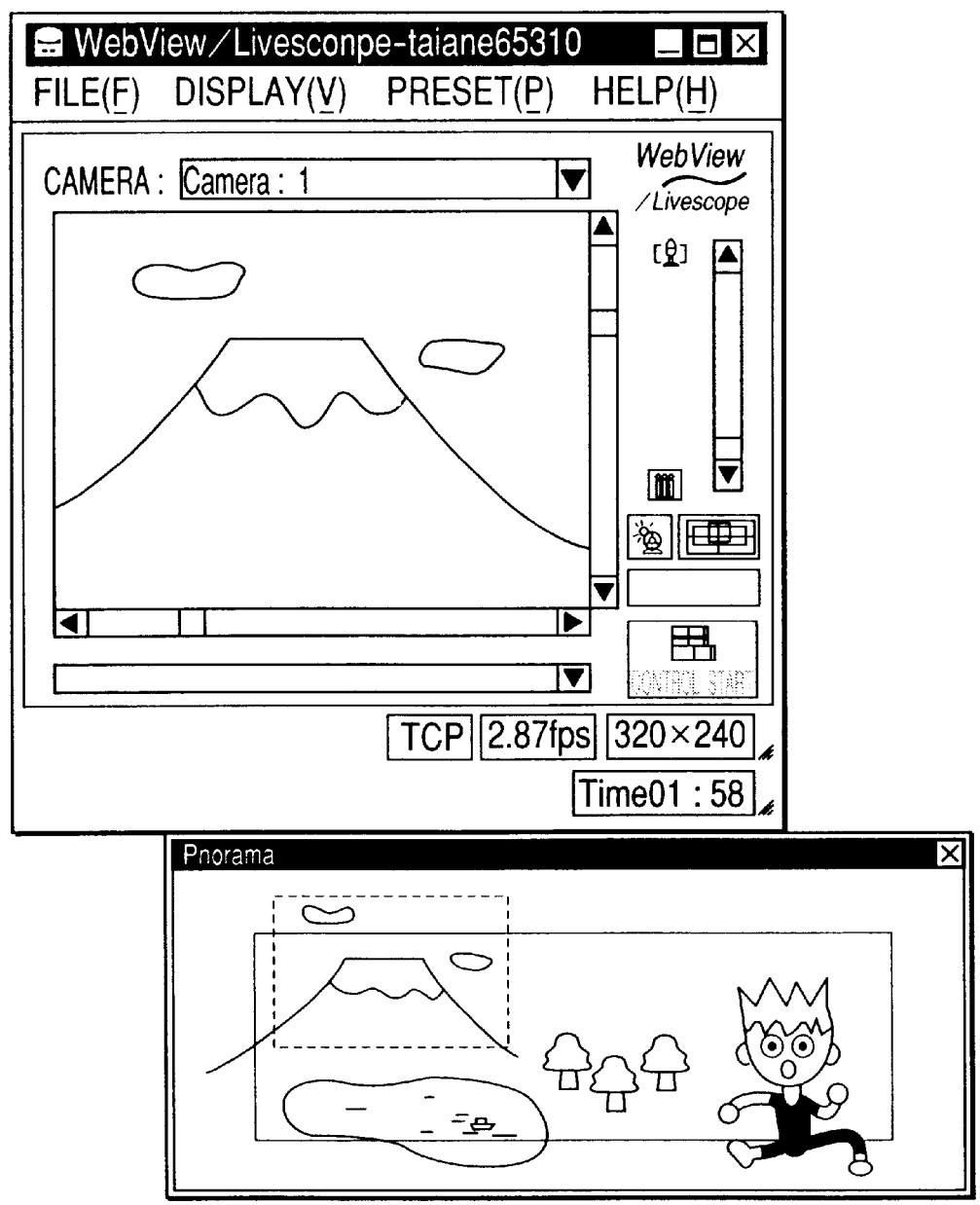
FIG. 8 shows examples of a moving image display window and a panorama image window.

On the side of the client received the panorama image in the visible range, the panorama image for the camera control shown in the lower area of FIG. 8 is displayed in a window different from a window shown in the upper area of FIG. 8 for displaying a moving image. The panorama image displayed is based upon a display size (called a base window size) of a panorama image without any visible range restriction.

The panorama image cut out basing upon the visible range restriction is displayed to be as equal size as possible to the base window size so that the client recognizes the visible range as less as possible. If the cut-out panorama image itself is displayed, the window size of the panorama image is changed with the visible range restriction. For example, if a client user accesses a server which changes the visible range on a day basis or accesses servers having different visible ranges at the same time, the panorama image is displayed in a different size each day or in a different size depending upon the accessed server. The client user may feel such an operation of GUI something unusual. The client user may become conscious of visible range restriction.

One method of displaying the panorama image to be as equal size as possible to a panorama image without any visible range restriction is to set one of the vertical and horizontal sides equal to the base window size and the other shorter than the base window size, while the vertical and horizontal side ratio is maintained constant, as shown in FIG. 7A and FIGS. 9A to 9C.

First at S1401, after a panorama image cut out in accordance with the visible range restriction is received, the width and height (W, H) of a predetermined display window are compared with the width and height (PW, PH) of the cut-out panorama image (S1402) to check whether W/PW≧H/PH is satisfied or not (S1403).

If satisfied at S1403, the cut-out panorama image is enlarged without changing the vertical and horizontal side ratio so as to make the width of the cut-out panorama image equal to the width of the display window size, and displayed on the display window (S1404).

If not satisfied at S1403, the cut-out panorama image is enlarged without changing the vertical and horizontal side ratio so as to make the height of the cut-out panorama image equal to the height of the display window size, and displayed on the display window (S1405).

Figure 9A:
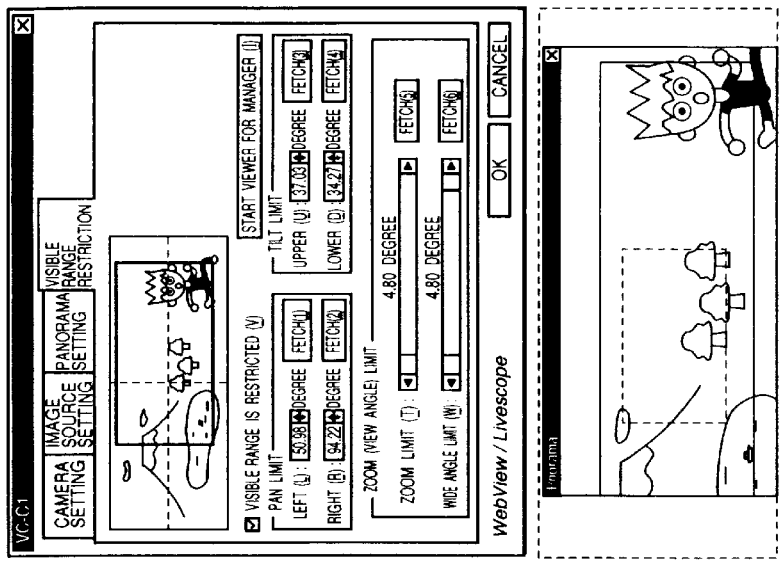
FIGS. 9A, 9B and 9C illustrate a method of displaying a panorama image.
Figure 9B:
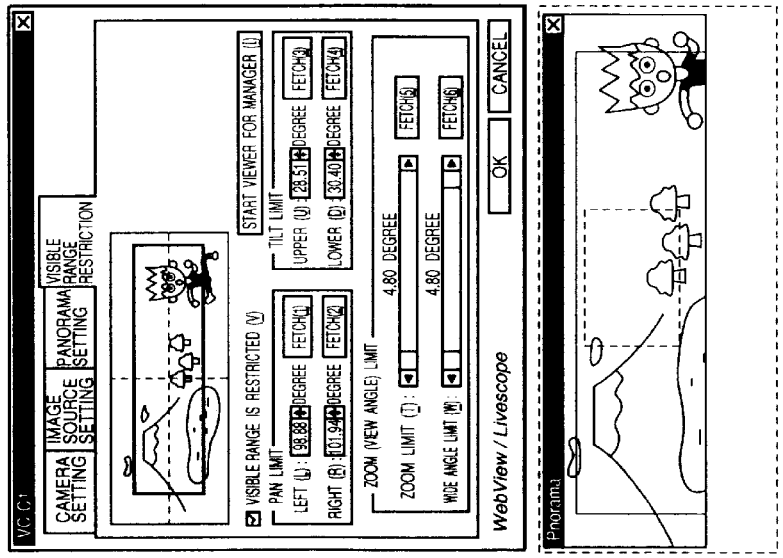
Figure 9C:
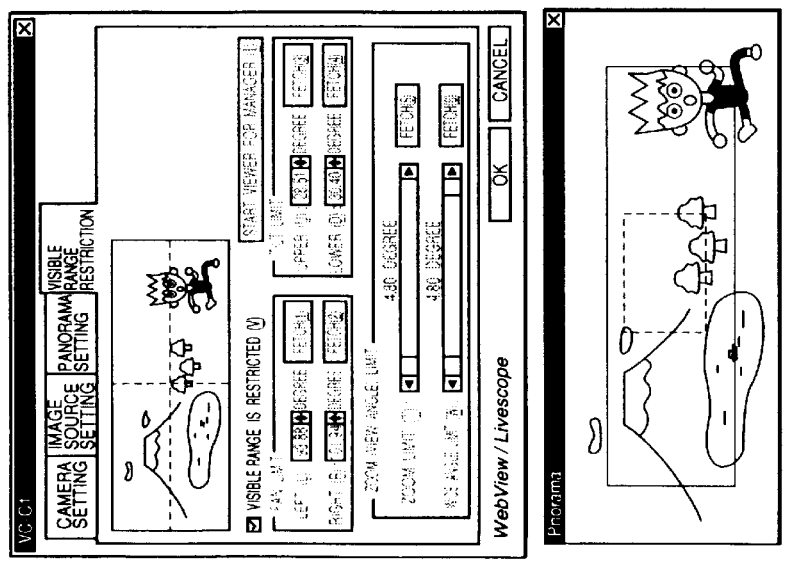

FIGS. 9A to 9C show examples of the panorama image displayed.

The upper area of each of FIGS. 9A to 9C shows the screen for setting the visual range at the server, and the lower area shows the screen at the client.

FIG. 9A shows the screen when the visual range restriction is not performed.

The lower area of FIG. 9A shows a panorama image in the visible range equal to the whole photographing area of the camera. A broken line frame indicates an area in which a moving image is displayed. By moving this frame and changing the frame size, pan/tilt/zoom of the camera can be controlled. A narrow black line indicates an area in which the center of the broken line frame can be moved for zoom setting.

FIGS. 9B and 9C show the screen when the visual range restriction is performed. W/PW≧H/PH is satisfied in the case of FIG. 9B, whereas W/PW≧H/PH is not satisfied in the case of FIG. 9C. A bold line shown in the upper areas of FIGS. 9B and 9C indicates a visible range set by an administrator.

Another method of displaying the panorama image to be as equal size as possible to a panorama image without any visible range restriction is to set one of the vertical and horizontal sides equal to the base window size and the other longer than the base window size, while the vertical and horizontal side ratio is maintained constant, as shown in FIG. 7B and FIGS. 10A to 10C.

First at S1411, after a panorama image cut out in accordance with the visible range restriction is received, the width and height (W, H) of a predetermined display window are compared with the width and height (PW, PH) of the cut-out panorama image (S1412) to check whether W/PW≧H/PH is satisfied or not (S1413).

If satisfied at S1413, the cut-out panorama image is enlarged without changing the vertical and horizontal side ratio so as to make the height of the cut-out panorama image equal to the height of the display window size, and displayed on the display window (S1414).

If not satisfied at S1413, the cut-out panorama image is enlarged without changing the vertical and horizontal side ratio so as to make the width of the cut-out panorama image equal to the width of the display window size, and displayed on the display window (S1415).

Since the vertical or horizontal side of the enlarged panorama image is larger than the window size, a scroll bar is disposed one of the vertical and horizontal sides (S1416, S1417) so that the panorama image can be scrolled in one direction. If apportion of a scope to be described later becomes invisible while the panorama image is scrolled, the panorama image is automatically scrolled to make the scope visible.

FIGS. 10A to 10C show examples of the panorama image displayed.

The upper area of each of FIGS. 10A to 10C shows the screen for setting the visual range at the server, and the lower area shows the screen at the client.

FIG. 10A shows the screen when the visual range restriction is not performed.

The lower area of FIG. 10A shows a panorama image in the visible range equal to the whole photographing area of the camera. A broken line frame indicates an area in which a moving image is displayed. By moving this frame and changing the frame size, pan/tilt/zoom of the camera can be controlled. A narrow line indicates an area in which the center of the broken line frame can be moved for zoom setting.

FIGS. 10B and 10C show the screen when the visual range restriction is performed. W/PW≧H/PH is satisfied in the case of FIG. 10B, the height of the cut-out panorama image is made equal to the height of the base window, and the scroll bar is disposed in the horizontal direction. W/PW≧H/PH is not satisfied in the case of FIG. 10C, the width of the cut-out panorama image is made equal to the width of the base window, and the scroll bar is disposed in the vertical direction.

A bold line shown in the upper areas of FIGS. 10B and 10C indicates a visible range set by an administrator.

The size of a window displayed in this manner has a fixed size. Therefore, a client user can control the camera by using the panorama image without becoming conscious of the visible range restriction.

On the panorama image displayed on the client side, a broken line frame is displayed which indicates a current photographing area (scope). As the camera is controlled, the scope moves in accordance with this control. A client user can control the camera by using the panorama image.

The following operations are possible on the panorama image.

"Click": Pan/tilt is changed so that the clicked position becomes the center of pan/tilt. If a position in the scope is clicked, this position becomes the center of pan/tilt.

"Click position in scope and drag it with mouse": The scope moves in accordance with the motion of the mouse. When the mouse is released, pan/tilt is changed to take an image at the scope position.

"Resize scope": When a frame of the scope is clicked and dragged with a mouse, the size of the scope can be changed. In accordance with this resizing, the zoom is controlled.

"Draw rubber band": When a position outside of the scope is clicked and dragged, a frame (rubber band) is drawn in accordance with the motion of the mouse. In order to use the rubber band as a new scope when the mouse is released, pan/tilt/zoom is changed.

If the visible range is set too narrow, the above-described algorithm makes the magnification factor too large. Therefore, the image shown in FIG. 11A is so rough that it cannot be recognized as a panorama image. In this case, the panorama image is not used as a background, but only a background color or a predetermined image is displayed to control the camera by operating the scope in the window. Alternatively, as shown in FIG. 1C, without using the enlarged image, the server may take a new panorama image corresponding to the visible range restriction. In this case, the panorama image is taken each time the visible range restriction is changed, so that the server administrator is required to perform a cumbersome work. However, the visible range restriction made too narrow is rare, and if the following automatic photographing mechanism is incorporated, such a cumbersome work is avoided.

Specifically, after the visible range restriction is set, the panorama image generation module is set so that it automatically operates while a client does not access. When a client accesses during photographing, the panorama image generation is cancelled to stand by until the client disconnects. In order to generate a panorama image corresponding to the visible range, an image in each divided area of the visible range is taken not by setting the view angle to the maximum zoom values but by setting the zoom values so that one of the vertical and horizontal sides of the visible range is set equal to the size of the photographing, area and the other is set shorter. In this case, one of the vertical and horizontal sides is not necessary to be photographed divisionally so that the divisional photographing is performed by changing either pan or tilt. A panorama image photographed in this manner becomes fine as shown in FIG. 11C and the rough image such as shown in FIG. 11A is not displayed.

The visible range is judged as narrow if the height (vertical) or width (horizontal) of an image in the visible range is smaller than the vertical or horizontal side of an image taken at a maximum, magnification factor of the camera. This judgement may be made by comparing an area of a predetermined frame with an area of the visible range.

The invention is also applicable to a system having a plurality of apparatuses (e.g., a host computer, an interface apparatus, a reader, a printer and the like) or to a single apparatus (e.g., a copier, a facsimile or the like).

The scope of the invention contains also the case wherein software program codes realizing the function of each embodiment described above are supplied to a computer (CPU or MPU) of the apparatus or system connected to various devices realizing the embodiment function, and the computer operates the devices in accordance with the stored programs.

In this case, the software program code themselves realize the embodiment function. Therefore the program codes themselves and means for supplying the program codes, e.g., a storage medium storing the program codes, constitute the present invention.

The storage medium for storing such program codes may be a floppy disk, a hard disk, an optical disk, a magnetooptical disk, a CD-ROM, a magnetic tape, a nonvolatile memory card, a ROM or the like.

It is obvious that the program codes are included in the embodiment of the invention, wherein not only the computer executes the supplied program codes to realize the embodiment function but also the program codes in cooperation with an OS (operating system) running on the computer or with another application or the like realize the embodiment function.

It is obvious that the scope of the invention also contains the case wherein the functions of each embodiment can be realized by writing the program codes into a memory of a function expansion board inserted into a computer or of a function expansion unit connected to the computer, and thereafter by executing a portion or the whole of actual processes by a CPU of the function expansion board or function expansion unit.

As described so far, according to the invention, an area outside of the visible range is not displayed but only an area in the visible range is displayed to a client. Accordingly, a client is less conscious of a presence of the visible range restriction.

An image in the visible range is variably magnified so as to make the size near to that of the base window. It is therefore possible to make a client less conscious of a change in the size of an image displayed in the base window.

If one of the vertical and horizontal sides of an image in the visible range is shorter than the vertical or horizontal side of an image taken at the maximum magnification factor of the camera, the camera is controlled so that an image in the visual range is newly taken and the enlarged image of a rough quality is not displayed.

The invention is not limited only to the above embodiments, but various modifications are possible without departing from the scope of the appended claims.

What is claimed is:

1. An image processing apparatus comprising:
   display control means for displaying an image on a display unit, the image representative of a range capable of being taken with a controllable image pickup unit; and
   setting means for setting a visible range permittable to be taken with the image pickup unit by controlling the image pickup unit,
   wherein said display control means display on said display unit an image in the visible range set by said setting means and an image outside of the visible range in different states capable of being visually discriminated,
   parameter display input means is provided to display parameter information representative of said visible range in an area different from said image and to receive a parameter input to set said visible range, and
   the image representative of said visible range in the image displayed on said display unit is changed with the display of said parameter display input means.

2. An image processing apparatus according to claim 1, further comprising panorama image generating means for generating a panorama image by coupling and synthesizing the plurality of images taken with the image pickup unit,
   wherein the panorama image is used as said image representative of the range capable of being taken.

3. An image processing apparatus according to claim 1, wherein said display control means displays an area in the visible range set by said setting means in color and an area outside of the visible range set by said setting means in black and white.

4. A image processing apparatus according to claim 1, wherein the image pickup unit is arranged on a network.

5. An image processing apparatus according to claim 1, wherein said parameter is represented by a numerical value.

6. An image processing apparatus according to claim 1, further comprising:
   rectangle displaying means for displaying a rectangle in an image displayed on the display unit;
   receiving means for receiving a change in a size of the rectangle; and
   zoom restricting means for restricting a zoom ability of the image pickup unit in accordance with the size of the rectangle received by said receiving means.

7. A image processing apparatus comprising:
   display control means for displaying an image in a photographing area of a controllable image pickup unit on a display unit;
   rectangle display means for displaying a rectangle in the image displayed on the display unit, the rectangle indicating a zoom ability of the image pickup unit;
   zoom ability setting means for setting a range of the zoom ability of the image pickup unit; and
   display change means for changing a size of the rectangle in accordance with the setting made by said zoom ability setting means.

8. An image processing apparatus according to claim 7, further comprising operation reception means for receiving an operation of changing the size of the rectangle to set the zoom ability.

9. An image processing method comprising the steps of:
   displaying an image on a display unit, the image representative of a range capable of being taken with a controllable image pickup unit; and
   setting a visible range permittable to be taken with the image pickup unit by controlling the image pickup unit,
   wherein said displaying step displays on said display unit an image in the visible range set by said setting step and an image outside of the visible range in different states capable of being visually discriminated,
   said setting step displays parameter information representative of said visible range in an area different from said image and receives a parameter input to set said visible range, and
   the image representative of said visible range in the image displayed on said display unit is changed with the display of said parameter information.

10. An image processing method according to claim 9, further comprising a step of generating a panorama image by coupling and synthesizing a plurality of images taken with the image pickup unit,
   wherein the panorama image is used as said image representative of the range capable of being taken.

11. An image processing method according to claim 9, wherein said displaying step displays an area in the visible range set by said setting step in color and an area outside of the visible range set by said setting step in black and white.

12. An image processing method according to claim 9, wherein the image pickup unit is arranged on a network.

13. An image processing method according to claim 9, wherein said parameter is represented by a numerical value.

14. An image processing method according to claim 9, further comprising the steps of:
- displaying a rectangle in an image displayed on the display unit;
- receiving a change in a size of the rectangle; and
- restricting a zoom ability of the image pickup unit in accordance with the size of the rectangle received by said receiving step.

15. An image processing method comprising the steps of:
- displaying an image in a photographing area of a controllable image pickup unit on a display unit;
- displaying a rectangle in the image displayed on the display unit, the rectangle indicating a zoom ability of the image pickup unit;
- setting a range of the zoom ability of the image pickup unit; and
- changing a size of the rectangle in accordance with the setting made by said zoom ability setting step.

16. An image processing method according to claim 15, further comprising a step of receiving an operation of changing the size of the rectangle to set the zoom ability.

17. A storage medium which stored a program to be read and executed by a computer, the program realizing the function of an image processing method comprising the steps of:
- displaying an image on a display unit, the image representative of a range capable of being taken with a controllable image pickup unit; and
- setting a visible range permittable to be taken with the image pickup unit by controlling the image pickup unit,
- wherein said displaying step displays on said display unit an image in the visible range set by said setting step and an image outside of the visible range in different states capable of being visually discriminated,
- said setting step displays parameter information representative of said visible range in an area different from said image and receives a parameter input to set said visible range, and
- the image representative of said visible range in the image displayed on said display unit is changed with the display of said parameter information.

18. A storage medium with stored a program to be read and executed by a computer, the program realizing the function of an image processing method comprising the steps of:
- displaying an image in a photographing area of a controllable image pickup unit on a display unit;
- displaying a rectangle in the image displayed on the display unit, the rectangle indicating a zoom ability of the image pickup unit;
- setting a range of the zoom ability of the image pickup unit; and
- changing a size of the rectangle in accordance with the setting made by said zoom ability setting step.

19. An image processing apparatus comprising:
- receiving means for receiving image information in a visible range in a whole photographing area of an image pickup unit;
- display control means for displaying an image in the visible range on a display unit in accordance with the image information received by said receiving means, without displaying an area outside of the visible range; and
- receiving means for receiving an instruction to the visible range displayed on the display unit when the photographing area of the image pickup unit is changed.

20. A image processing apparatus according to claim 19, wherein the image in the visible range is an image cut out from a panorama image formed by coupling images taken with the image pickup unit.

21. An image processing apparatus according to claim 19, wherein said display control means includes variable magnifying means for variably magnifying the image in the visible range to a size near to a size of a window on a display screen of the display unit.

22. An image processing apparatus according to claim 19, wherein said display control means includes means for newly generating an image in the visible range and displaying the new image on the display unit by controlling the image pickup unit, if at least one of the vertical and horizontal sides of the image in the visible range is smaller than a vertical or horizontal size of an image obtained at a maximum magnification factor of the image pickup unit.

23. An image processing apparatus according to claim 19, wherein said display control means includes means for controlling to display a predetermined image on the display unit, if at least one of vertical and horizontal sides of the image in the visible range is smaller than a vertical or horizontal size of an image obtained at a maximum magnification factor of the image pickup unit.

24. An image processing apparatus according to claim 19, wherein the image pickup unit is a camera arranged on a network.

25. An image processing apparatus according to claim 21, wherein said variable magnifying means variably magnifies the image in the visible range so as to make one of vertical and horizontal sides of the image in the visible range equal to the size of the window while a ratio between the vertical and horizontal sides is maintained unchanged.

26. An image processing method comprising the steps of:
- receiving image information in a visible range in a whole photographing area of an image pickup unit;
- displaying an image in the visible range on a display unit in accordance with the image information received by said receiving step, without displaying an area outside of the visible range; and
- receiving an instruction to the visible range displayed on the display unit when the photographing area of the image pickup unit is changed.

27. An image processing method according to claim 26, wherein the image in the visible range is an image cut out from a panorama image formed by coupling images taken with the image pickup unit.

28. An image processing method according to claim 26, wherein said display control step includes a variable magnifying step of variably magnifying the image in the visible range to a size near to a size of a window on a display screen of the display unit.

29. An image processing method according to claim 26, wherein said display control step includes a step of newly generating an image in the visible range and displaying the new image on the display unit by controlling the image pickup unit, if at least one of vertical and horizontal sides of the image in the visible range is smaller than a vertical or horizontal size of an image obtained at a maximum magnification factor of the image pickup unit.

30. An image processing method according to claim 26, wherein said display control step includes a step of controlling to display a predetermined image on the display unit, if at least one of vertical and horizontal sides of the image in the visible range is smaller than a vertical or horizontal size of an image obtained at a maximum magnification factor of the image pickup unit.

31. An image processing method according to claim 26, wherein the image pickup unit is a camera arranged on a network.

32. An image processing method according to claim 28, wherein said variable magnifying step variably magnifies the image in the visible range so as to make one of vertical and horizontal sides of the image in the visible range equal to the size of the window while a ratio between the vertical and horizontal sides is maintained unchanged.

33. An image processing apparatus comprising:
   means for generating an image indicating a whole photographing area of a remotely controllable image pickup unit;
   setting means for setting a visual range by designating an area in the image;
   transmitting means for transmitting an image in the visual range set by said setting means; and
   receiving means for receiving a control of the image pickup unit, the control being performed by using the image in the visual image.

34. An image processing apparatus according to claim 33, further comprising panorama image generating means for generating a panorama image by coupling and synthesizing the plurality of images taken with the image pickup unit,
   wherein said transmitting means transmits the image in the visual range cut out from the panorama image.

35. An image processing apparatus according to claim 33, wherein the image pickup unit is a camera arranged on a network.

36. An image processing method comprising the steps of:
   generating an image indicating a whole photographing area of a remotely controllable image pickup unit;
   setting a visual range by designating an area in the image;
   transmitting an image in the visual range set by said setting step; and
   receiving a control of the image pickup unit, the control being performed by using the image in the visual range.

37. An image processing method according to claim 36, further comprising panorama image generating means for generating a panorama image by coupling and synthesizing the plurality of images taken with the image pickup unit,
   wherein said transmitting step transmits the image in the visual range cut out from the panorama image.

38. An image processing method according to claim 36, wherein the image pickup unit is a camera arranged on a network.

39. An image distributing system having a server for distributing an image taken with a remotely controllable image pickup unit to a network and a client for browsing the image distributed to the network, wherein:
   said server comprises:
      means for generating an image indicating a whole photographing area of the image pickup unit;
      setting means for setting a visual range by designating an area in the image;
      transmitting means for transmitting an image in the visual range set by said setting means; and
      receiving means for receiving a control of the image pickup unit, the control being performed by using the image in the visual range, and
   said client comprises:
      receiving means for receiving image information in the visible range;
      display control means for displaying an image in the visible range on a display unit in accordance with the image information received by said receiving means, without displaying an area outside of the visible range; and
      change request transmitting means, responsible to a reception of an instruction entered in the visible range displayed on the display unit when the photographing area of the image pickup unit is changed, for transmitting a change request for the image pickup unit matching the instruction to said server.

40. An image distribution system according to claim 24, further comprising change request transmitting means for transmitting a change request for the camera matching the instruction received by said receiving means to a server.

41. An image distribution system according to claim 31, further comprising change request transmitting means for transmitting a change request for the camera matching the instruction received by said receiving means to a server.

42. A storage medium which stored a program to be read and executed by a computer, the program realizing the function of an image processing method comprising the steps of:
   receiving image information in a visible range in a whole photographing area of an image pickup unit;
   displaying an image in the visible range on a display unit in accordance with the image information received by said receiving step, without displaying an area outside of the visible range; and
   receiving an instruction to the visible range displayed on the display unit when the photographing area of the image pickup unit is changed.

43. A storage medium which stored a program to be read and executed by a computer, the program realizing the function of an image processing method comprising the steps of:
   generating an image indicating a whole photographing area of a remotely controllable image pickup unit;
   setting a visual range of designating an area in the image;
   transmitting an image in the visual range set by said setting step; and
   receiving a control of the image pickup unit, the control being performed by using the image in the visual range.

* * * * *